US012772042B2

(12) United States Patent
Ma et al.

(10) Patent No.: US 12,772,042 B2
(45) Date of Patent: Oct. 20, 2026

(54) METHODS AND SYSTEMS FOR UPDATING USER EQUIPMENT CAPABILITY INFORMATION

(71) Applicant: ZTE Corporation, Shenzhen (CN)

(72) Inventors: Wei Ma, Shenzhen (CN); Hongjun Liu, Shenzhen (CN); Dongmei Li, Shenzhen (CN); Wu Wen, Shenzhen (CN); Li Tian, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 324 days.

(21) Appl. No.: 18/504,492

(22) Filed: Nov. 8, 2023

(65) Prior Publication Data

US 2024/0080657 A1 Mar. 7, 2024

Related U.S. Application Data

(63) Continuation of application No. PCT/CN2022/101233, filed on Jun. 24, 2022.

(51) Int. Cl.
*H04W 8/18* (2009.01)
*H04W 8/22* (2009.01)
(Continued)

(52) U.S. Cl.
CPC ............. *H04W 8/22* (2013.01); *H04W 76/10* (2018.02); *H04W 76/30* (2018.02)

(58) Field of Classification Search
CPC ....... H04W 8/22; H04W 76/10; H04W 76/30; H04W 8/24; H04W 76/15; H04W 88/06;
(Continued)

(56) References Cited

U.S. PATENT DOCUMENTS

2015/0365821 A1 12/2015 Chang et al.
2017/0171902 A1* 6/2017 Tillman ................ H04W 76/16
(Continued)

FOREIGN PATENT DOCUMENTS

CN 111512657 8/2020
CN 112399506 2/2021
(Continued)

OTHER PUBLICATIONS

International Search Report and Written Opinion for PCT/CN2022/101233, filed Jun. 24, 2022, Report dated Nov. 8, 2022, 9 pages.
(Continued)

*Primary Examiner* — Joseph E Dean, Jr.
(74) *Attorney, Agent, or Firm* — Ashurst Perkins; Coie US LLP

(57) ABSTRACT

Methods and systems for techniques for updating user equipment capability information are disclosed. In an implementation, a method of wireless communication includes transmitting, by a wireless device, to a first network in a first communication connection with the wireless device, a user equipment assistance information message to update a radio access capability between the wireless device and the first network due to detecting a change in the radio access capability between the wireless device and the first network based on an establishment of a second communication connection between the wireless device and a second network; or based on a determination by the wireless device to update the radio access capability between the wireless device and the first network.

20 Claims, 10 Drawing Sheets

(51) Int. Cl.
*H04W 76/10* (2018.01)
*H04W 76/30* (2018.01)

(58) Field of Classification Search
CPC ..... H04W 8/183; H04W 24/08; H04W 76/16; H04W 76/28; H04B 7/0413
See application file for complete search history.

(56) References Cited

U.S. PATENT DOCUMENTS

| | | | | |
|---|---|---|---|---|
| 2019/0230497 A1* | 7/2019 | Ljung | ..................... | H04W 8/22 |
| 2021/0105866 A1 | 4/2021 | Kavuri et al. | | |
| 2021/0120524 A1* | 4/2021 | Palle | ................... | H04W 60/005 |

FOREIGN PATENT DOCUMENTS

| | | |
|---|---|---|
| CN | 112616185 | 4/2021 |
| JP | 2024-530049 A | 8/2022 |
| WO | 2022/082556 A1 | 4/2022 |

OTHER PUBLICATIONS

ZTE Corp. "Consideration on the MUSIM UE capability reporting" 3GPP TSG-RAN2 Meeting #117 electronic R2-2202885, Online, Feb. 21-Mar. 3, 2022, 16 pages.
Vivo "[Pre117-e][230][MUSIM] Summary Stage-3 details of MUSIM" 3GPP TSG-RAN WG2 Meeting #117e R2-2203635, E-Conference, Feb. 21-Mar. 3, 2022, 24 pages.
Vivo "Remaining issue on Multi-USIM UE capabilities" 3GPP TSG-RAN WG2 Meeting #117 electronic R2-2202966, E-Meeting, Feb. 21-Mar. 3, 2022, 13 pages.
Nokia, et al. "Remaining issue on Multi-USIM UE capabilities" 3GPP TSG-RAN WG2 Meeting #118 Electronic R2-2204615, May 9-May 19, 2022, 22 pages.
Ericsson, "Summary of Offline Discussion—MultiSIM" 3GPP TSG-RAN WG3 #115-e R3-222566, Feb. 21-Mar. 3, 2022, 19 pages.
Ericsson "Summary of Offline Discussion—MultiSIM" 3GPP TSG-RAN WG3 #115-e R3-222841, Feb. 21-Mar. 3, 2022, 19 pages.
Intel Corp. "MUSIM remaining issue on gap capability signalling" 3GPP TSG-RAN WG2 Meeting #117-e R2-2202646, e-Meeting, Feb. 21-Mar. 3, 2022. 2 pages.
Nokia et al. "Clarifications for MUSIM UAI handling" 3GPP TSG-RAN WG2 Meeting #118 Electronic R2-2204618, May 9-May 19, 2022, 17 pages.
Ericsson "Remaining aspects on UE capabilities for Multi-USIM and other issues" 3GPP TSG-RAN WG2 #118e Tdoc R2-2205756, Electronic meeting, May 9-20, 2022, 3 pages.
Extended European Search Report for 22947413.5, Report dated May 13, 2025, 10 pages.
JPO, Office Action for Japanese Application No. 2024-560512, mailed on Nov. 25, 2025, 9 pages with unofficial English translation.
Notice of Allowance for co-pending Japanese Patent Application No. 2024-560512, dated May 27, 2026, 3 pages with unofficial English translation.
Motorola Mobility, et al. "Solution for short and long suspension of connection for coordinated leaving," SA WG2 Meeting #S2-136AH, S2-2000276, Jan. 13-17, 2020, Incheon, South Korea, 5 pages.

* cited by examiner

METHODS AND SYSTEMS FOR UPDATING USER EQUIPMENT CAPABILITY INFORMATION

CROSS-REFERENCE TO RELATED APPLICATION

This application is a continuation and claims priority to International Application No. PCT/CN2022/101233, filed on Jun. 24, 2022, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for updating user equipment capability information.

In one aspect, a method of data communication is disclosed. The method includes transmitting, by a wireless device, to a first network in a first communication connection with the wireless device, a user equipment assistance information message to update a radio access capability between the wireless device and the first network due to detecting a change in the radio access capability between the wireless device and the first network based on an establishment of a second communication connection between the wireless device and a second network; or based on a determination by the wireless device to update the radio access capability between the wireless device and the first network.

In another aspect, a method of data communication is disclosed. The method includes transmitting, by a wireless device, to a first network, a user equipment assistance information message to update a first radio access capability between the wireless device and the first network based on releasing a second communication connection between the wireless device and a second network.

In another aspect, a method of data communication is disclosed. The method includes receiving, by a first network, a user equipment assistance information message that is transmitted from the wireless device to update a radio access capability between the wireless device and the first network.

In another example aspect, a wireless communication apparatus comprising a processor configured to implement an above-described method is disclosed.

In another example aspect, a computer storage medium having code for implementing an above-described method stored thereon is disclosed.

These, and other, aspects are described in the present document.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

Figure 1:
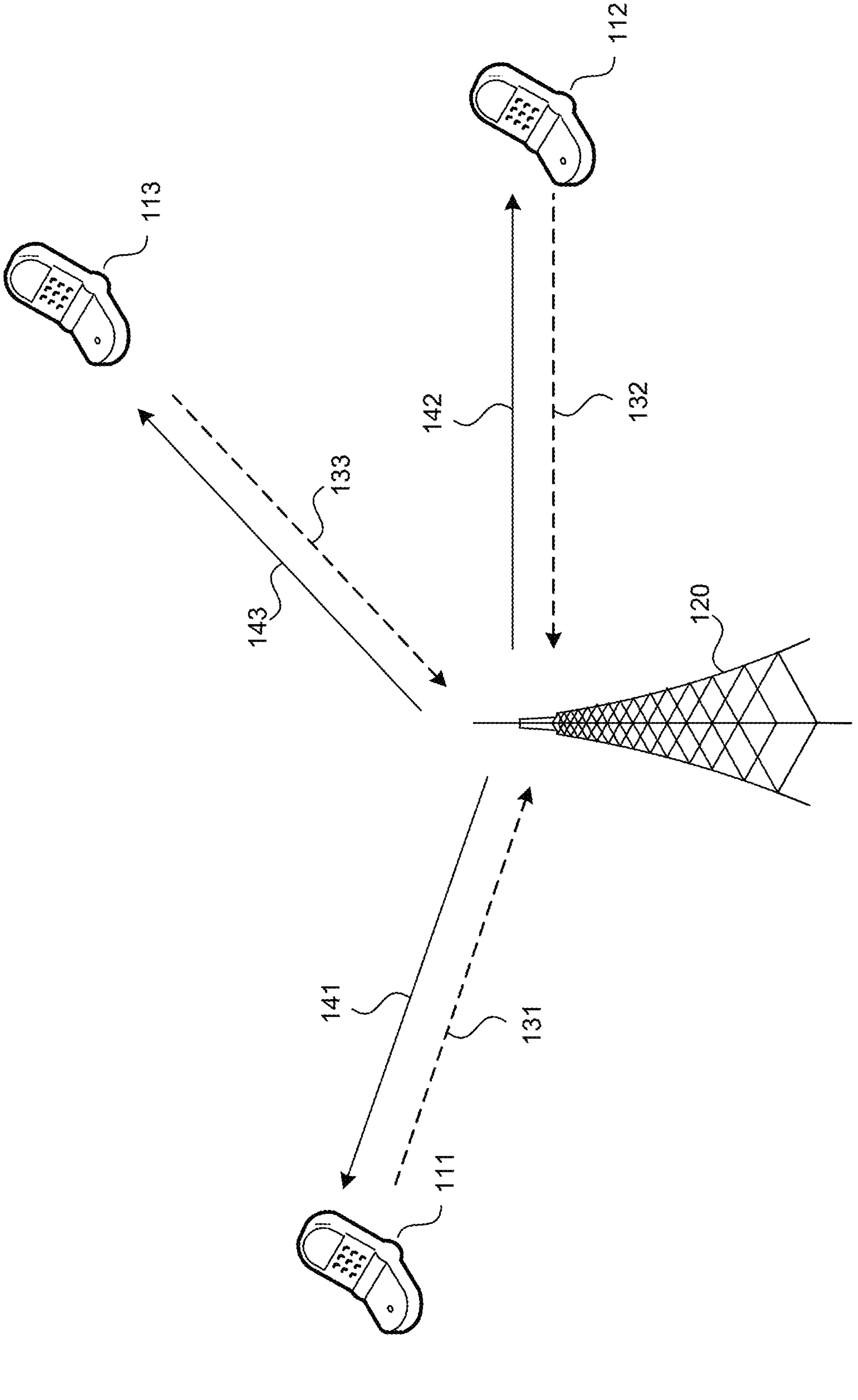
FIG. 1 shows an example of a wireless communication system based on some example embodiments of the disclosed technology.

FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

Figure 2:
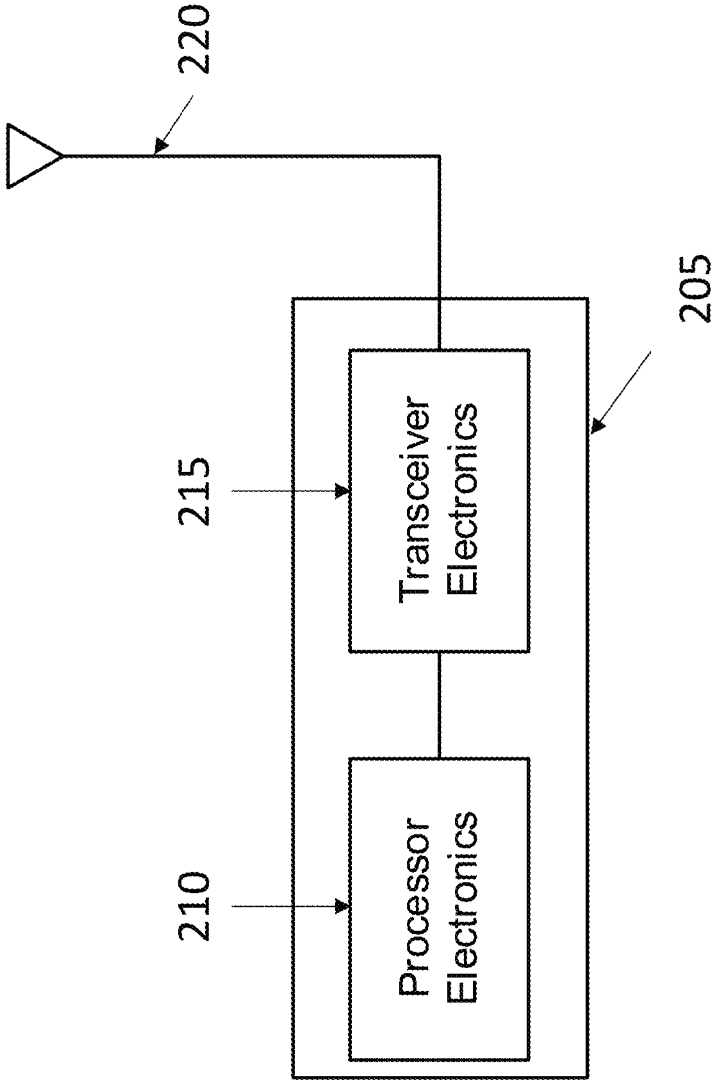
FIG. 2 is a block diagram representation of a portion of an apparatus based on some embodiments of the disclosed technology.

FIG. 2 is a block diagram representation of a portion of an apparatus based on some embodiments of the disclosed technology. An apparatus 205 such as a network device or a base station or a wireless device (or UE), can include processor electronics 210 such as a microprocessor that implements one or more of the techniques presented in this document. The apparatus 205 can include transceiver electronics 215 to send and/or receive wireless signals over one or more communication interfaces such as antenna(s) 220. The apparatus 205 can include other communication interfaces for transmitting and receiving data. Apparatus 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the apparatus 205.

The hardware capabilities of UE include multiple universal subscriber identity modules (MUSIM) that are shared by a plurality of SIMs. In order to use the hardware capabilities of UE efficiently and economically, the hardware capabilities need to be dynamically split between the multiple SIMs. In some cases, UE can experience a temporary hardware conflict, which may require UE to release some resources (e.g., SCell/SCG) from one of the SIMs. For example, when SIM A of a UE is in a Radio Resource Control (RRC) connected state in Network A while SIM B of the UE is in an RRC idle state or RRC inactive state in Network B, the two radio frequency (RF) chains will be occupied by the SIM A for the communication in Network A. Once the UE's SIM B enters an RRC connected state, one of the RF chains needs to be switched to SIM B. In this case, if Network A is not aware of the UE's reduced capability in RF chain, there may be data loss due to demodulation failures and wasting radio resources in Network A. The disclosed technology can be implemented in some embodiments to address these issues by imposing temporary restrictions on the UE capability using assistance (e.g., assistance information) from the UE in communication with Network A.

In some implementations, dual transmitter/receiver (Tx/Rx) MUSIM can be used. For example, the following techniques can be employed to implement MUSIM.

Figure 3:
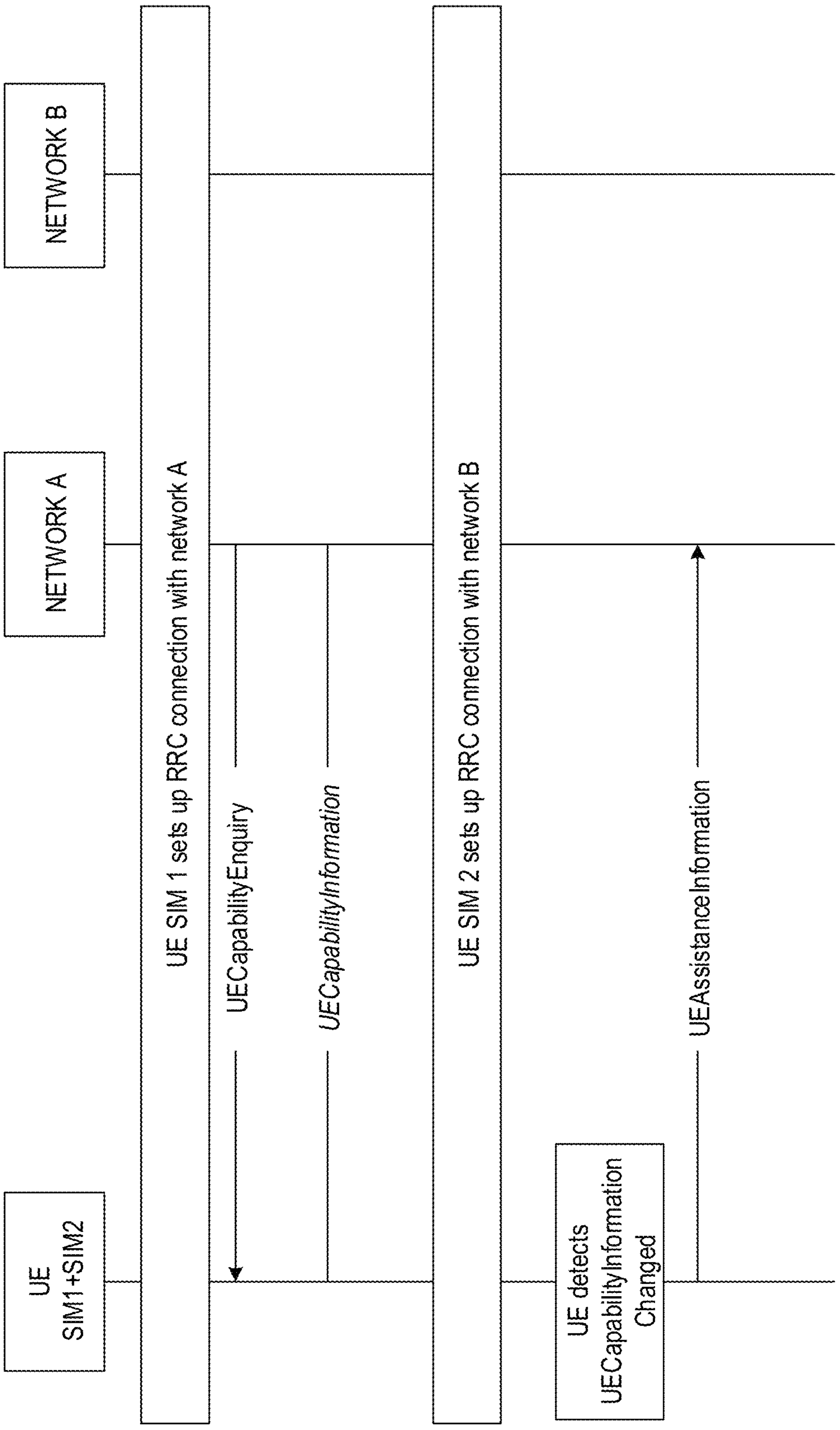
FIG. 3 shows an example of UE capability transfer based on some embodiments of the disclosed technology.

FIG. 3 shows an example of UE capability transfer based on some embodiments of the disclosed technology.

In some embodiments of the disclosed technology, UE capability transfer may include the following operations:

1. UE has 2 USIMs (Sim1 and Sim2), and UE sets up RRC connection with network A using SIM1;
2. Network A sends a UE capability enquiry message (UECapabilityEnquiry message) to UE to retrieve UE radio access capability information;
3. UE sends UE capability information message (UEcapabilityinformation message) to network A in response to the UE capability enquiry message (UECapabilityEnquiry message) and submits the UE capability information to the network;
4. UE initiates RRC connection set up procedure with network B using SIM2 (e.g., sends RRCsetuprequest message);
5. UE detects UE capability information, which UE can provide to network A, has been changed because of RRC connection with network B. The connection with network B occupies one or more TXs/RXs, resulting in changes in the UE radio access capability, which UE can provide to network A; and
6. UE sends UE assistance information message (UEAssistanceInformation message) to network A to update the UE capability information.

Figure 4:
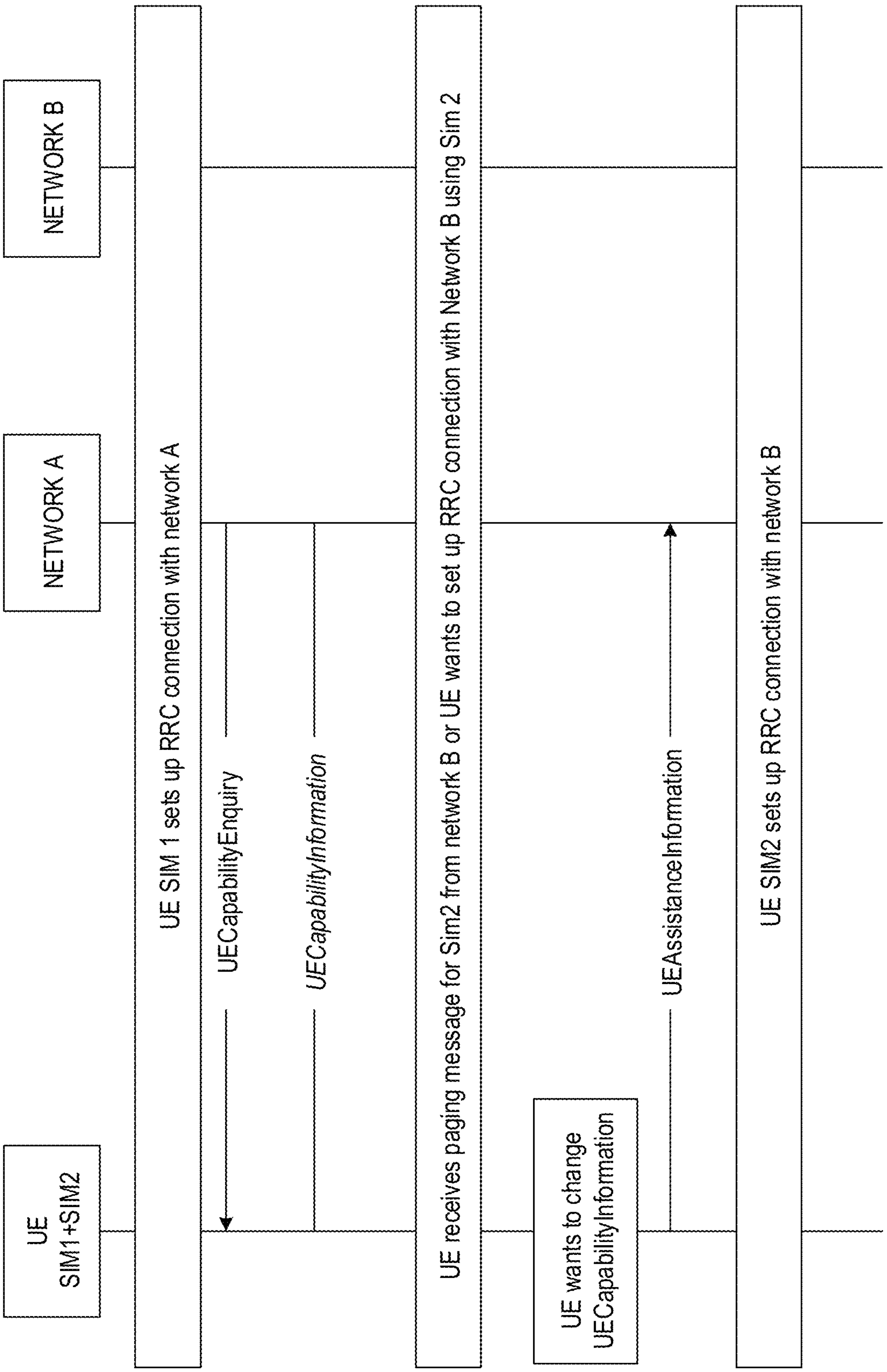
FIG. 4 shows another example of UE capability transfer based on some embodiments of the disclosed technology.

FIG. 4 shows another example of UE capability transfer based on some embodiments of the disclosed technology.

In some embodiments of the disclosed technology, UE capability transfer may include the following operations:

1. UE has 2 USIMs (Sim1 and Sim2), and UE sets up RRC connection with network A using SIM1;
2. Network A sends a UE capability enquiry message (UECapabilityEnquiry message) to UE to retrieve UE radio access capability information;
3. UE sends UE capability information message (UEcapabilityinformation message) to network A in response to the UE capability enquiry message (UECapabilityEnquiry message) and submits the UE capability information to the network;
4. UE receives paging message for Sim2 from network B or UE wants to set up RRC connection with network B using SIM 2;
5. In order to set up RRC connection with network B, UE will use or transfer at least one TX/RX for network B. Thus, UE will try to change or update the UE capabilities provided to network A;
6. UE sends UE assistance information message (UEAssistanceInformation message) to network A to update the UE capability information; and
7. UE initiates RRC connection set up procedure with network B using SIM2 after, before, or at the same time as the above step 6.

Figure 5:
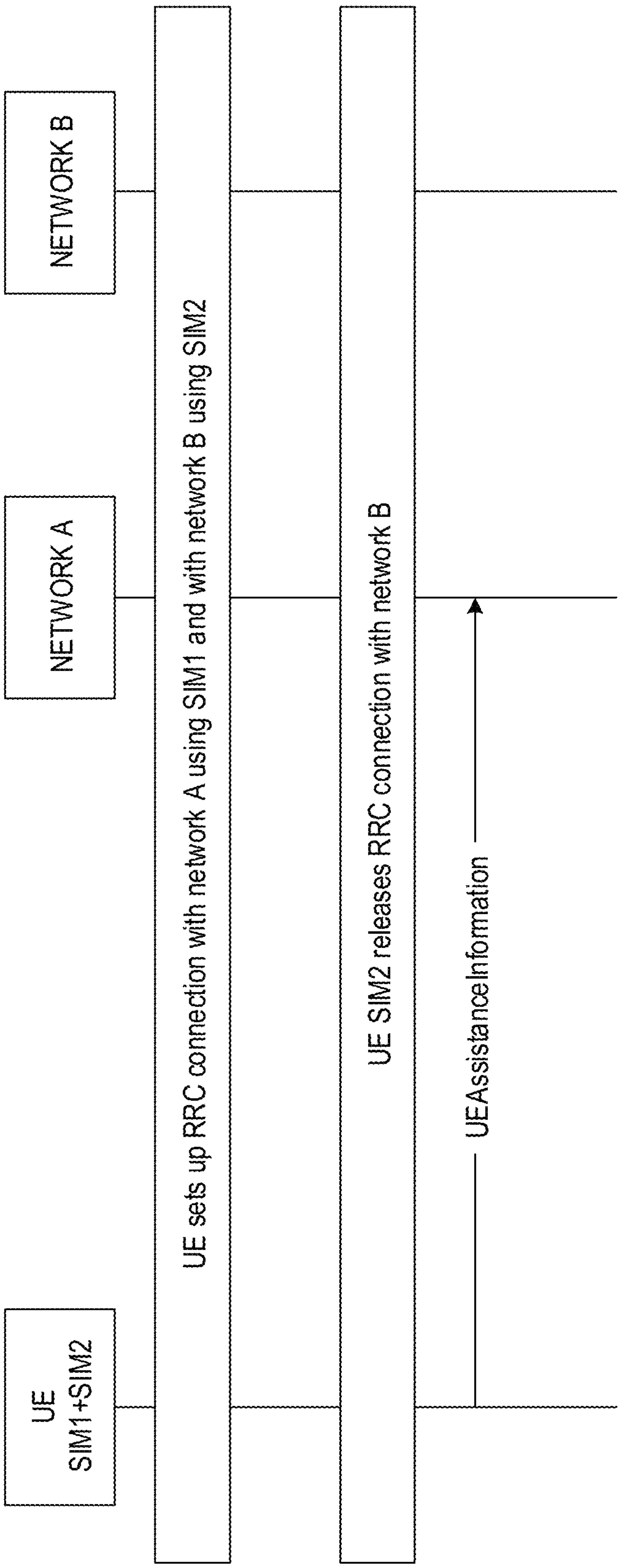
FIG. 5 shows another example of UE capability transfer based on some embodiments of the disclosed technology.

FIG. 5 shows another example of UE capability transfer based on some embodiments of the disclosed technology.

In some embodiments of the disclosed technology, UE capability transfer may include the following operations:

1. UE has set up RRC connection with network A using SIM1 and with network B using SIM2. During the procedure, UE may have sent UE capability information message (UEcapabilityinformation message) to network A and/or network B following the procedure shown in FIG. 3 or FIG. 4;
2. UE releases RRC connection with network B, and the related TX/RX resource will be released; and
3. UE detects the UE capabilities, which UE can provide to network A, has been changed. The UE sends UE assistance information message (UEAssistanceInformation message) to network A to update UE capability information.

TABLE 1

UE assistance information message (UEAssistanceInformation message)

```
-- ASN1START
-- TAG-UEASSISTANCEINFORMATION-START
UEAssistanceInformation ::=          SEQUENCE {
  criticalExtensions                   CHOICE {
    ueAssistanceInformation              UEAssistanceInformation-IEs,
    criticalExtensionsFuture             SEQUENCE { }
  }
}
UEAssistanceInformation-IEs ::=      SEQUENCE {
  delayBudgetReport                    DelayBudgetReport                   OPTIONAL,
  lateNonCriticalExtension             OCTET STRING                        OPTIONAL,
  nonCriticalExtension                 UEAssistanceInformation-v1540-IEs   OPTIONAL
}
```

TABLE 1-continued

UE assistance information message (UEAssistanceInformation message)

```
DelayBudgetReport::=                    CHOICE {
   type1                                      ENUMERATED {
                                                 msMinus1280, msMinus640, msMinus320,
msMinus160,msMinus80, msMinus60, msMinus40,
                                                 msMinus20, ms0, ms20,ms40, ms60, ms80, ms160,
ms320, ms640, ms1280},
   ...
}
UEAssistanceInformation-v1540-IEs ::= SEQUENCE {
   overheatingAssistance                      OverheatingAssistance                 OPTIONAL,
   nonCriticalExtension                       UEAssistanceInformation-v1610-IEs     OPTIONAL
}
OverheatingAssistance ::=               SEQUENCE {
   reducedMaxCCs                              ReducedMaxCCs-r16                     OPTIONAL,
   reducedMaxBW-FR1                           ReducedMaxBW-FRx-r16                  OPTIONAL,
   reducedMaxBW-FR2                           ReducedMaxBW-FRx-r16                  OPTIONAL,
   reducedMaxMIMO-LayersFR1                   SEQUENCE {
      reducedMIMO-LayersFR1-DL                   MIMO-LayersDL,
      reducedMIMO-LayersFR1-UL                   MIMO-LayersUL
   } OPTIONAL,
   reducedMaxMIMO-LayersFR2                   SEQUENCE {
      reducedMIMO-LayersFR2-DL                   MIMO-LayersDL,
      reducedMIMO-LayersFR2-UL                   MIMO-LayersUL
   } OPTIONAL
}
OverheatingAssistance-r17 ::=           SEQUENCE {
   reducedMaxBW-FR2-2-r17                     SEQUENCE {
      reducedBW-FR2-2-DL-r17                     ReducedAggregatedBandwidth-r17        OPTIONAL,
      reducedBW-FR2-2-UL-r17                     ReducedAggregatedBandwidth-r17        OPTIONAL
   } OPTIONAL,
   reducedMaxMIMO-LayersFR2-2                 SEQUENCE {
      reducedMIMO-LayersFR2-2-DL                 MIMO-LayersDL,
      reducedMIMO-LayersFR2-2-UL                 MIMO-LayersUL
   } OPTIONAL
}
ReducedAggregatedBandwidth ::= ENUMERATED {mhz0, mhz10, mhz20, mhz30, mhz40, mhz50, mhz60,
mhz80, mhz100, mhz200, mhz300, mhz400}
ReducedAggregatedBandwidth-r17 ::= ENUMERATED {mhz0, mhz100, mhz200, mhz400, mhz800, mhz1200,
mhz1600, mhz2000}
UEAssistanceInformation-v1610-IEs ::= SEQUENCE {
   idc-Assistance-r16                         IDC-Assistance-r16                    OPTIONAL,
   drx-Preference-r16                         DRX-Preference-r16                    OPTIONAL,
   maxBW-Preference-r16                       MaxBW-Preference-r16                  OPTIONAL,
   maxCC-Preference-r16                       MaxCC-Preference-r16                  OPTIONAL,
   maxMIMO-LayerPreference-r16                MaxMIMO-LayerPreference-r16           OPTIONAL,
   minSchedulingOffsetPreference-r16          MinSchedulingOffsetPreference-r16     OPTIONAL,
   releasePreference-r16                      ReleasePreference-r16                 OPTIONAL,
   sl-UE-AssistanceInformationNR-r16          SL-UE-AssistanceInformationNR-r16     OPTIONAL,
   referenceTimeInfoPreference-r16            BOOLEAN                               OPTIONAL,
   nonCriticalExtension                       UEAssistanceInformation-v1700-IEs     OPTIONAL
}
UEAssistanceInformation-v1700-IEs ::= SEQUENCE {
   ul-GapFR2-Preference-r17                   UL-GapFR2-Preference-r17                OPTIONAL,
   musim-Assistance-r17                       MUSIM-Assistance-r17                    OPTIONAL,
   overheatingAssistance-r17                  OverheatingAssistance-r17               OPTIONAL,
   maxBW-PreferenceFR2-2-r17                  MaxBW-PreferenceFR2-2-r17               OPTIONAL,
   maxMIMO-LayerPreferenceFR2-2-r17           MaxMIMO-LayerPreferenceFR2-2-r17        OPTIONAL,
   minSchedulingOffsetPreferenceExt-r17       MinSchedulingOffsetPreferenceExt-r17    OPTIONAL,
   rlm-MeasRelaxationState-r17                BOOLEAN                                 OPTIONAL,
   bfd-MeasRelaxationState-r17                BIT STRING (SIZE (32))                  OPTIONAL,
   nonSDT-DataIndication-r17                  SEQUENCE {
      resumeCause-r17                               ResumeCause                       OPTIONAL
   }                                                                                  OPTIONAL,
   scg-DeactivationPreference                 ENUMERATED { scgDeactivationPreferred, noPreference }
OPTIONAL,
   uplinkData-r17                             ENUMERATED { true }                     OPTIONAL,
   rrm-MeasRelaxationFulfilment-r17           BOOLEAN                                 OPTIONAL,
   nonCriticalExtension                       SEQUENCE { }                            OPTIONAL
}
UEAssistanceInformation-v1800-IEs ::= SEQUENCE {
   MUSIM-Assistance-r18                    MUSIM-Assistance -r18          OPTIONAL,
   nonCriticalExtension                       SEQUENCE { }                            OPTIONAL
}
MUSIM-Assistance -r18::                 SEQUENCE {
UAI-UECapabilityInformation-IEs-R-18          UECapabilityInformation-IEs OPTIONAL
UAI-UECapabilityInformation                   BOOLEAN                OPTIONAL
}
```

TABLE 1-continued

UE assistance information message (UEAssistanceInformation message)

```
SL-UE-AssistanceInformationNR-r16 ::= SEQUENCE (SIZE (1..maxNrofTrafficPattern-r16)) OF SL-
TrafficPatternInfo-r16
SL-TrafficPatternInfo-r16::=            SEQUENCE {
  trafficPeriodicity-r16                  ENUMERATED {ms20, ms50, ms100, ms200, ms300, ms400,
ms500, ms600, ms700, ms800, ms900, ms1000},
  timingOffset-r16                        INTEGER (0..10239),
  messageSize-r16                         BIT STRING (SIZE (8)),
  sl-QoS-FlowIdentity-r16                 SL-QoS-FlowIdentity-r16
}
UL-GapFR2-Preference-r17::=             SEQUENCE {
  ul-GapFR2-PatternPreference-r17         BIT STRING (SIZE (4))          OPTIONAL
--Editor's note: This is to indicate the preferred UL gap pattern, as defined in TS38.133.
}
-- TAG-UEASSISTANCEINFORMATION-STOP
-- ASN1STOP
```

In some implementations, UE assistance information (UEAssistanceInformation) includes a UE capability information (UECapabilityInformation) to update the UE capability information (UECapabilityInformation) in the network.

Alternatively, UE assistance information (UEAssistanceInformation) includes a UE capability information indicator (UECapabilityInformationindicator) to update the UE capability information indicator (UECapabilityInformationindicator) in the network.

If the UE capability information (UECapabilityInformation) in the UE assistance information message (UEAssistanceInformation message), the network updates the UE capabilities according to the UE capability information (UECapabilityInformation) in the UE assistance information (UEAssistanceInformation).

If the UE capability information indicator (UECapabilityInformationindicator) in the UE assistance information message (UEAssistanceInformation message), the network updates the UE capabilities according to the indicator and the UE capabilities in UE assistance information message (UEAssistanceInformation message).

Alternatively, if the UE capability information indicator (UECapabilityInformationindicator) in the UE assistance information message (UEAssistanceInformation message), the network updates the UE capabilities according to the indicator and the UE capabilities sets in UE assistance information message (UEAssistanceInformation message). In some implementations, a plurality of sets can be used for one Radio Access Technology (RAT) type.

TABLE 2

UE capability information message (UE CapabilityInformation message)

```
-- ASN1START
-- TAG-UECAPABILITYINFORMATION-START
UECapabilityInformation ::=            SEQUENCE {
    rrc-TransactionIdentifier              RRC-TransactionIdentifier,
    criticalExtensions                     CHOICE {
        ueCapabilityInformation                UECapabilityInformation-IEs,
        criticalExtensionsFuture               SEQUENCE { }
    }
}
UECapabilityInformation-IEs ::=        SEQUENCE {
    ue-CapabilityRAT-ContainerList         UE-CapabilityRAT-ContainerList
OPTIONAL,
    lateNonCriticalExtension               OCTET STRING
OPTIONAL,
    nonCriticalExtension                   SEQUENCE{ }
OPTIONAL
}
-- TAG-UECAPABILITYINFORMATION-STOP
-- ASN1STOP
UE-CapabilityRAT-ContainerList ::=       SEQUENCE (SIZE (0..maxRAT-CapabilityContainers)) OF UE-
CapabilityRAT-Container
UE-CapabilityRAT-Container ::=           SEQUENCE {
    rat-Type                               RAT-Type,
    ue-CapabilityRAT-Container             OCTET STRING
    ue-CapabilityRAT-Container_2             OCTET STRING
}
-- TAG-UE-CAPABILITYRAT-CONTAINERLIST-STOP
-- ASN1STOP
  UE-NR-Capability ::=     SEQUENCE {
    accessStratumRelease           AccessStratumRelease,
    pdcp-Parameters                PDCP-Parameters,
    rlc-Parameters                 RLC-Parameters
OPTIONAL,
    mac-Parameters                 MAC-Parameters
OPTIONAL,
```

TABLE 2-continued

| UE capability information message (UE CapabilityInformation message) | |
|---|---|
| phy-Parameters | Phy-Parameters, |
| rf-Parameters | RF-Parameters, |
| measAndMobParameters | MeasAndMobParameters |
| OPTIONAL, | |
| fdd-Add-UE-NR-Capabilities | UE-NR-CapabilityAddXDD-Mode |
| OPTIONAL, | |
| tdd-Add-UE-NR-Capabilities | UE-NR-CapabilityAddXDD-Mode |
| OPTIONAL, | |
| fr1-Add-UE-NR-Capabilities | UE-NR-CapabilityAddFRX-Mode |
| OPTIONAL, | |
| fr2-Add-UE-NR-Capabilities | UE-NR-CapabilityAddFRX-Mode |
| OPTIONAL, | |
| featureSets | FeatureSets |
| OPTIONAL, | |
| featureSetCombinations | SEQUENCE (SIZE (1..maxFeatureSetCombinations)) OF |
| FeatureSetCombination OPTIONAL, | |
| lateNonCriticalExtension | OCTET STRING (CONTAINING UE-NR-Capability-v15c0) |
| OPTIONAL, | |
| nonCriticalExtension | UE-NR-Capability-v1530 |
| OPTIONAL | |
| } | |

In UE capability information message (UE CapabilityInformation message), a ue-CapabilityRAT-Container_2 may be introduced.

The capabilities set in ue-CapabilityRAT-Container_2 and ue-CapabilityRAT-Container are different.

The network stores the UE capabilities in the 2 containers, and takes one of them as UE's capability.

Figure 6:
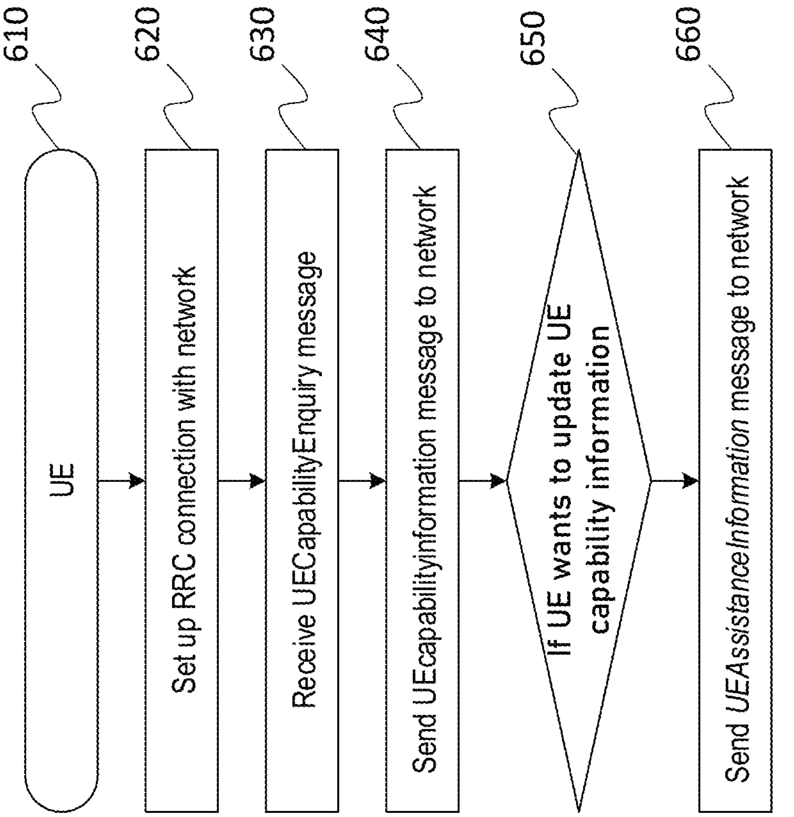
FIG. 6 shows an example of UE capability transfer procedure of a wireless device based on some embodiments of the disclosed technology.

FIG. 6 shows an example of UE capability transfer procedure of a wireless device based on some embodiments of the disclosed technology.

In some embodiments of the disclosed technology, UE capability transfer may include the following operations:

1. UE sets up RRC connection with a network;
2. UE receives UE capability enquiry message (UEcapabilityEnquiry message) from the network;
3. UE sends UE capability information message (UEcapabilityInformation message) to the network in response to the UE capability enquiry message (UEcapabilityEnquiry message);
4. After 840, while UE maintains the RRC connection with the network, if the UE wants to update the UE capability information, because SIM2 sets up a new RRC connection with another network (multi-sim UE), or UE releases RRC connection with another network using SIM2 (multi-sim UE), or any other reasons; and
5. The UE send UE assistance information (UEAssistanceInformation) to the network to update UE capability information.

Scenario 1:

At 830, the UE sends UE capability information message (UEcapabilityInformation message) with only one UE capability set (e.g., under the current technology) to the network, At 850, the UE sends UE assistance information (UEAssistanceInformation) to the network. The UE assistance information (UEAssistanceInformation) includes "UECapabilityInformation" IE, and notifies the network to update the UE capabilities according to UECapabilityInformation IE.

After 850, the UE sends UE assistance information message ((UEAssistanceInformation message) to the network. The UE assistance information (UEAssistanceInformation) includes UE capability information indicator ("UECapabilityInformationindicator") IE, and notifies the network to update the UE capabilities according to the indicator and UE capability information in the UE capability information message (UEcapabilityInformation message) at 830.

Scenario 2:

At 830, the UE sends UE capability information message (UEcapabilityInformation message) with a plurality of UE capability sets for a rat-type to the network, and notifies the network to use one of the plurality of UE capability sets (e.g., set1) for one or more rat-types in the UE capability information message (UEcapabilityInformation message).

At 850, the UE sends UE assistance information message (UEAssistanceInformation message) to the network. The UE assistance information (UEAssistanceInformation) includes UE capability information indicator ("UECapabilityInformationindicator") IEs, and notifies the network to update the UE capabilities according to UE capability information indicator ("UECapabilityInformationindicator") IE. For example, the UE uses one of the plurality of UE capability sets (e.g., set2) for one or more rat-types in the UE capability information message (UEcapabilityInformation message) received at 840.

After 850, the UE sends UE assistance information message ((UEAssistanceInformation message) to the network. The UE assistance information (UEAssistanceInformation) includes UE capability information indicator ("UECapabilityInformationindicator") IE, and notifies the network to update the UE capabilities according to the indicator and the UE capability information indicator. For example, some of the operations can be repeated, and sea can be used again.

Figure 7:
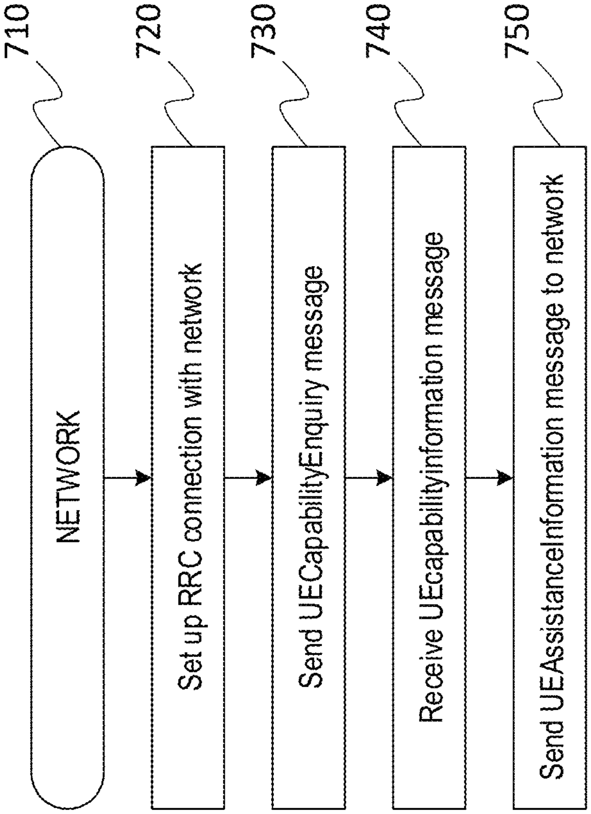
FIG. 7 shows an example of UE capability transfer procedure of a network based on some embodiments of the disclosed technology.

FIG. 7 shows an example of UE capability transfer procedure of a network based on some embodiments of the disclosed technology.

In some embodiments of the disclosed technology, UE capability transfer may include the following operations:

1. A network sets up RRC connection with a UE;
2. The network sends UE capability enquiry message (UEcapabilityEnquiry message) to the UE;
3. The network receives UE capability information message (UEcapabilityInformation message), which is sent in response to the UE capability enquiry message (UEcapabilityEnquiry message); and
4. The network receives UE assistance information message ((UEAssistanceInformation message) initiated by the UE, and updates the UE's capability information stored in the network.

Scenario 1:

At 930, the network receives the UE capability information message (UEcapabilityInformation message) with only one UE capability set (e.g., under the current technology) to the network.

At 940, the network receives the UE assistance information message (UEAssistanceInformation message). The UE assistance information (UEAssistanceInformation) includes UE capability information ("UECapabilityInformation") IE, and the network updates the UE capabilities according to UE capability information (UECapabilityInformation) IE.

After 940, the network receives UE assistance information message (UEAssistanceInformation message). The UE assistance information (UEAssistanceInformation) includes UE capability information indicator ("UECapabilityInformationindicator") IE, and the network updates the UE capabilities according to the indicator and UE capability information in the UE capability information message (UEcapabilityInformation message) received at 930.

Scenario 2:

At 930, the network receives UE capability information message (UEcapabilityInformation message) with more than one UE capability sets for a rat-type to the network, and notifies the network to use one of the plurality of UE capability sets (e.g., set1) for one or more rat-type in the UE capability information message (UEcapabilityInformation message).

At 940, the network receives UE assistance information message (UEAssistanceInformation message). The UE assistance information (UEAssistanceInformation) includes UE capability information indicator ("UECapabilityInformationindicator") IEs, and the network updates the UE capabilities according to the UE capability information indicator ("UECapabilityInformationindicator") IE. For example, the network uses the set2 for one or more rat-types in the UE capability information message (UEcapabilityInformation message) received at 940.

After 940, the network receives UE assistance information message (UEAssistanceInformation message). The UE assistance information (UEAssistanceInformation) includes UE capability information indicator ("UECapabilityInformationindicator") IE, and the network update the UE capabilities according to the indicator and UE capability information indicator (UECapabilityInformationindicator). For example, some of the operations can be repeated, and sea can be used again.

As discussed above, if a network is not aware of changes in the radio access capability of a wireless device in communication with the network, radio resources can be wasted, and data loss can occur. The disclosed technology can be implemented in some embodiments to address these issues by updating UE capability information using UE assistance information provided by UE.

In some implementations, the UE transmits, to the network, UE assistance information message that includes UE capability information to update the UE's capability such as radio access capability where the UE includes a plurality of SIMs (e.g., MUSIM) and connection to or disconnection from a network by a certain SIM results in changes to the radio access capability of another SIM that is in communication with another network.

In some implementations, the UE assistance information message include "UE capabilities information" or "UE capabilities information indicator" to notify the network to update the UE's capability information.

The UE capability information message includes a plurality of sets/containers for one rat-type. In addition, the indicator in the UE assistance information can be used to indicate which one of the plurality of sets/containers should be used.

In some implementations, the procedure for the UE and the network can include the following operations: UE sets up RRC connection with a network; UE receives UE capability enquiry message from the network; UE sends UE capability information message to the network in response to the enquiry message; while UE keeps the RRC connection with the network, if the UE wants to update the UE capability information, e.g., because SIM2 has set up a new RRC connection with another network (e.g., multi-sim UE scenario), or has released RRC connection with another network using SIM2 (multi-sim UE), or any other reasons; the UE transmits UE assistance information to the network to update UE capability information.

In one scenario, a UE, which has transmitted UE capability information message with only one UE capability set (under the current technology) to the network, can transmit UE assistance information message to the network. In some implementations, the UE assistance information includes UE capability information IE, and notifies the network to update the UE capabilities according to UE capability information IE. After these operations, the UE transmits UE assistance information message to the network. The UE assistance information includes UE capability information indicator IE, and notifies the network to update the UE capabilities according to the indicator and UE capability information in the UE capability information message.

In another scenario, a UE, which has transmitted UE capability information message that includes a plurality of UE capability sets for a rat-type to the network, can notify the network to use at least one of the plurality of UE capability sets (e.g., set1) for one or more rat-types in the UE capability information message. The UE transmits UE assistance information message to the network. In some implementations, the UE assistance information includes UE capability information indicator IEs, and notifies the network to update the UE capabilities according to UE capability information indicator IE. For example, at least one of the plurality of UE capability sets (e.g., set2) can be used for one or more rat-types in the UE capability information message. After these operations, the UE transmits UE assistance information message to the network. In some implementations, the UE assistance information includes UE capability information indicator IE, and notifies the network to update the UE capabilities according to the indicator and UE capability information indicator. For example, some of the operations can be repeated, and sea can be used again.

Figure 8:
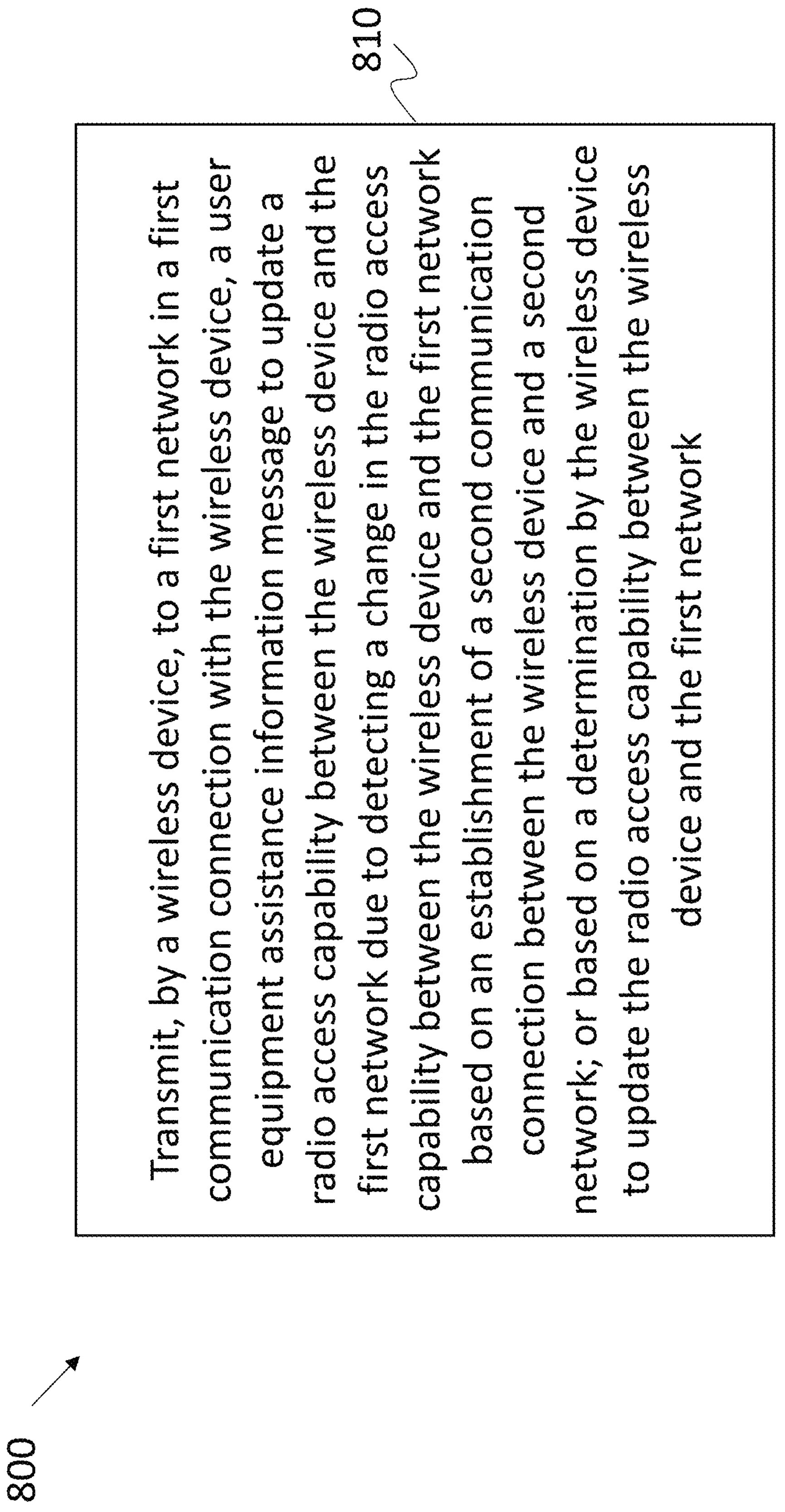
FIG. 8 shows an example of a process for wireless communication based on some example embodiments of the disclosed technology.

FIG. 8 shows an example of a process for wireless communication based on some example embodiments of the disclosed technology.

In some implementations, the process 800 for wireless communication may include, at 810, transmitting, by a wireless device, to a first network in a first communication connection with the wireless device, a user equipment assistance information message to update a radio access capability between the wireless device and the first network due to detecting a change in the radio access capability between the wireless device and the first network based on an establishment of a second communication connection between the wireless device and a second network; or based on a determination by the wireless device to update the radio access capability between the wireless device and the first network.

In one example, a process for wireless communication may include receiving, by a wireless device, a capability enquiry message from a first network in a first communication connection with a first subscriber identity module of the wireless device, transmitting, by the wireless device, to the first network, a capability information message indicating a radio access capability between the wireless device and the first network, initiating, by the wireless device, an establishment of a second communication connection between a second subscriber identity module of the wireless device and a second network, and transmitting, by the wireless device, to the first network, an assistance information message to update the radio access capability between the wireless device and the first network due to detecting a change in the radio access capability between the wireless device and the first network resulting from the establishment of the second communication connection; or based on a determination by the wireless device to update the radio access capability between the wireless device and the first network.

Figure 9:
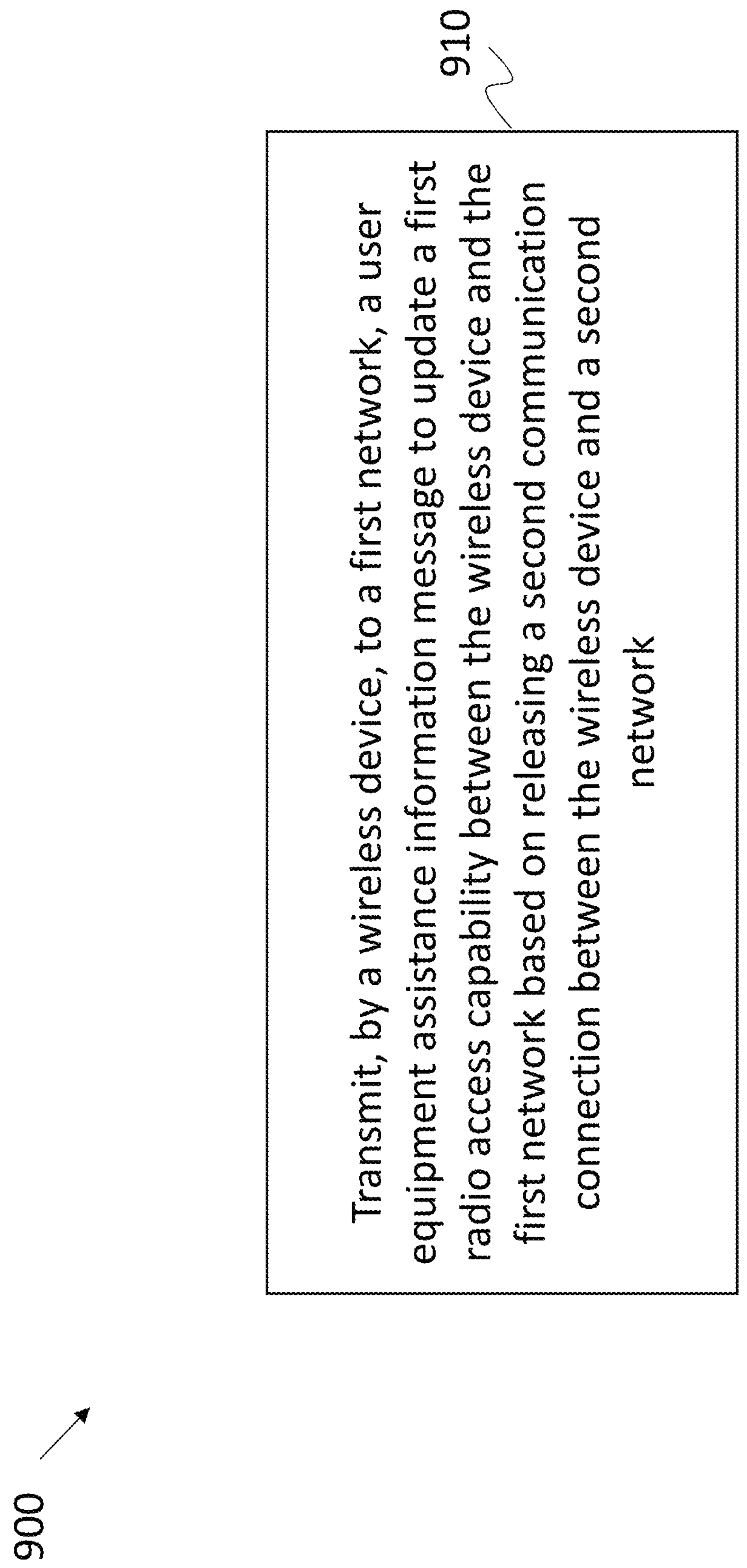
FIG. 9 shows another example of a process for wireless communication based on some example embodiments of the disclosed technology.

FIG. 9 shows another example of a process for wireless communication based on some example embodiments of the disclosed technology.

In some implementations, the process 900 for wireless communication may include, at 910, transmitting, by a wireless device, to a first network, a user equipment assistance information message to update a first radio access capability between the wireless device and the first network based on releasing a second communication connection between the wireless device and a second network.

In one example, a process for wireless communication may include establishing, by a wireless device, a first communication connection between a first subscriber identity module of the wireless device and a first network and a second communication connection between a second subscriber identity module of the wireless device and a second network, releasing, by the wireless device, the second communication connection, and transmitting, by the wireless device, to the first network, an assistance information message to update a first radio access capability between the wireless device and the first network based on a change in a second radio access capability between the wireless device and the second network resulting from the releasing of the second communication connection.

Figure 10:
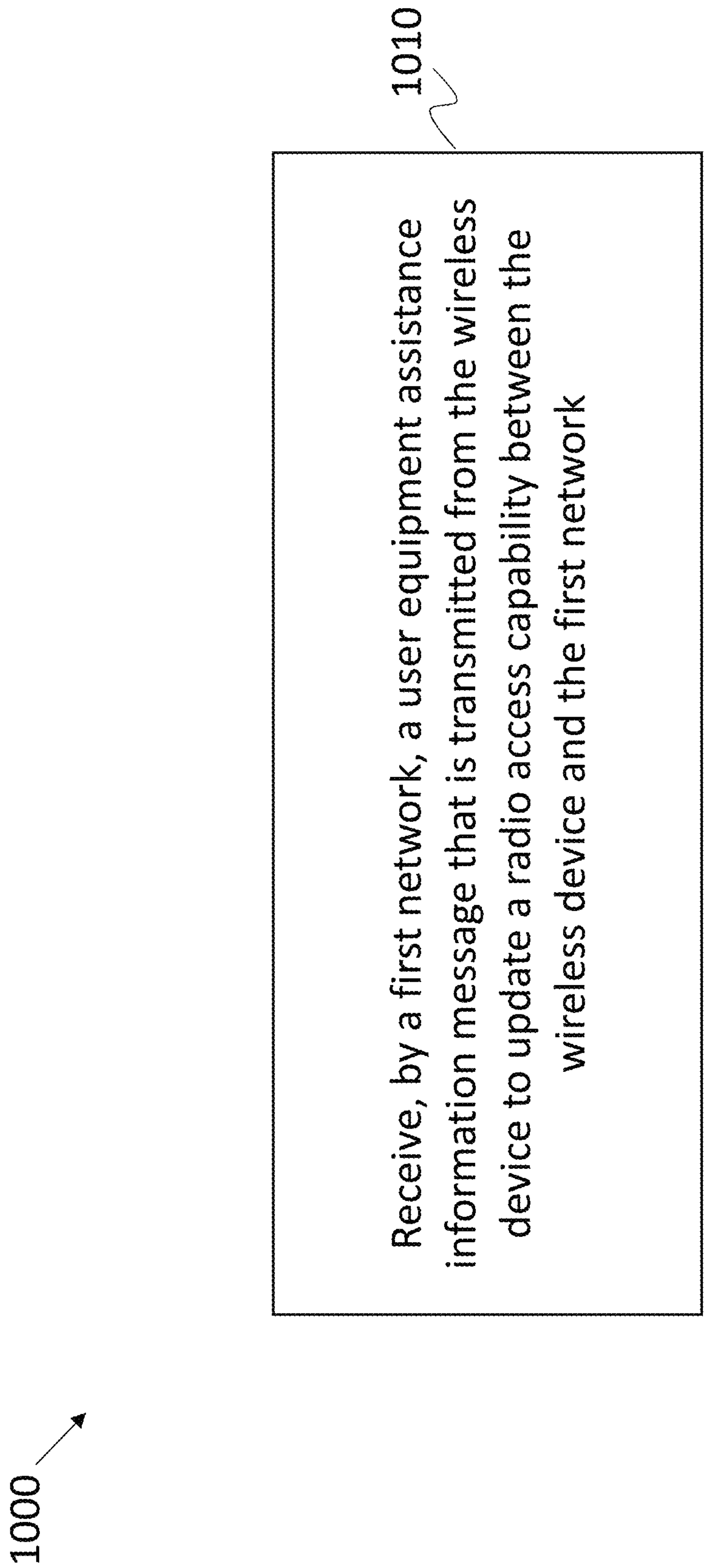
FIG. 10 shows another example of a process for wireless communication based on some example embodiments of the disclosed technology.

FIG. 10 shows another example of a process for wireless communication based on some example embodiments of the disclosed technology.

In some implementations, the process 1000 for wireless communication may include, at 1010, receiving, by a first network, a user equipment assistance information message that is transmitted from the wireless device to update a radio access capability between the wireless device and the first network.

In one example, a process for wireless communication may include transmitting, by a first network, to a wireless device, a capability enquiry message associated with a first communication connection with a first subscriber identity module of the wireless device, receiving, by the first network, a capability information message that is transmitted from the wireless device in response to the capability enquiry message, the capability information message indicating a radio access capability between the wireless device and the first network, receiving, by the first network, an assistance information message that is transmitted from the wireless device to update the radio access capability between the wireless device and the first network, and updating, by the first network, the radio access capability between the wireless device and the first network based on the capability information message and the assistance information message.

In some implementations, the wireless device includes a plurality of SIMs. For example, the plurality of SIMs includes the first subscriber identity module (e.g., SIM1) and the second first subscriber identity module (e.g., SIM2), and the SIM1 is used to communicate with the first network, and the SIM2 is used to communicate with the second network.

In some implementations, the capability information message may include the UE capability information message (UE CapabilityInformation message) discussed above.

In some implementations, the user equipment assistance information message may include the UE assistance information message (UEAssistanceInformation message) discussed above.

It will be appreciated that the present document discloses techniques that can be embodied in various embodiments to determine downlink control information in wireless networks. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the embodiments above and throughout this document. As used in the clauses below and in the claims, a wireless device may be user equipment, mobile station, or any other wireless terminal including fixed nodes such as base stations. A network device includes a base station including a next generation Node B (gNB), enhanced Node B (eNB), or any other device that performs as a base station.

Clause 1. A method of wireless communication, comprising: transmitting, by a wireless device, to a first network in a first communication connection with the wireless device, a user equipment assistance information message to update a radio access capability between the wireless device and the first network due to detecting a change in the radio access capability between the wireless device and the first network based on an establishment of a second communication connection between the wireless device and a second network; or based on a determination by the wireless device to update the radio access capability between the wireless device and the first network.

In some implementations, the wireless device may include user equipment (UE). In some implementations, the user equipment assistance information message may include the UE assistance information message (UEAssistanceInformation message) discussed above. In some implementations, the first network may include a base station including a next generation Node B (gNB), enhanced Node B (eNB), or any other device that performs as a base station.

Clause 2. The method of clause 1, further comprising: before transmitting the user equipment assistance information message to the first network, receiving, by the wireless device, a capability enquiry message from the first network in the first communication connection with a first subscriber identity module of the wireless device; and transmitting, by the wireless device, to the first network, a capability information message indicating a radio access capability between the wireless device and the first network.

In some implementations, the capability information message may include the UE capability information message (UE CapabilityInformation message) discussed above.

Clause 3. The method of clause 1, further comprising: before or after or concurrently with transmitting the user equipment assistance information message, initiating, by the wireless device, the establishment of the second communication connection.

Clause 4. The method of clause 1, wherein the user equipment assistance information message includes user equipment capability information.

Clause 5. The method of clause 1, wherein the capability information message includes at least two user equipment radio access capability sets associated with the wireless device, and wherein the user equipment assistance information message includes a capability information indicator to indicate a user equipment radio access capability set of the user equipment radio access capability sets.

Clause 6. The method of clause 5, wherein the user equipment capability set is combined with one or more user equipment capability radio access technology (RAT) containers, wherein each user equipment capability RAT container indicates user equipment capabilities associated with one RAT type.

Clause 7. The method of clause 5, wherein the capability information indicator in the user equipment assistance information message indicates a user equipment capability set in the capability information message.

Clause 8. The method of clause 1, wherein the second communication connection is a communication with the second network using a second subscriber identity module of the wireless device.

Clause 9. The method of clause 1, wherein the user equipment assistance information message is used to inform the network at least one of: a delay budget report carrying desired increment or decrement in a connected mode discontinuous reception (DRX) cycle length; an overheating assistance information; an in-device coexistence (IDC) assistance information; a preference on DRX parameters for power saving; a preference on a maximum aggregated bandwidth for power saving; a preference on a maximum number of secondary component carriers for power saving; a preference on a maximum number of multiple-input and multiple-output (MIMO) layers for power saving; a preference on a minimum scheduling offset for cross-slot scheduling for power saving; a preference on radio resource control (RRC) state; a configured grant assistance information for New Radio (NR) sidelink communication; a preference in being provisioned with reference time information; a preference for frequency range 2 (FR2) uplink (UL) gap; a preference to transition out of RRC_CONNECTED state for multiple universal subscriber identity modules (MUSIM) operation; a preference on the MUSIM gaps; a relaxation state for radio link monitoring (RLM) measurements; a relaxation state for beam failure detection (BFD) measurements; an availability of data mapped to radio bearers which are not configured for small data transmission (SDT); a preference for secondary cell group (SCG) to be deactivated; an indication that the wireless device has uplink data to transmit for a data radio bearer (DRB) for which there is no master cell group (MCG) radio link control (RLC) bearer while a secondary cell group (SCG) is deactivated; or a change to a fulfilment status for radio resource management (RRM) measurement relaxation criterion.

Clause 10. A method of wireless communication, comprising: transmitting, by a wireless device, to a first network, a user equipment assistance information message to update a first radio access capability between the wireless device and the first network based on releasing a second communication connection between the wireless device and a second network.

In some implementations, the wireless device may include user equipment (UE). In some implementations, the user equipment assistance information message may include the UE assistance information message (UEAssistanceInformation message) discussed above. In some implementations, the first network may include a base station including a next generation Node B (gNB), enhanced Node B (eNB), or any other device that performs as a base station.

Clause 11. The method of clause 10, further comprising: before or after or concurrently with transmitting the user equipment assistance information message, initiating the releasing of the second communication connection.

Clause 12. The method of clause 10, wherein the user equipment assistance information message includes user equipment capability information.

Clause 13. The method of clause 12, wherein the user equipment capability information includes at least two user equipment radio access capability sets associated with the wireless device, and wherein the user equipment assistance information message includes a capability information indicator to indicate a user equipment radio access capability set out of the user equipment radio access capability sets.

Clause 14. The method of clause 13, wherein the user equipment capability set is combined with one or more user equipment capability RAT containers, wherein each user equipment capability RAT container indicates user equipment capabilities associated with one RAT type.

Clause 15. The method of clause 13, wherein the capability information indicator in the user equipment assistance information message indicates a user equipment capability set in the user equipment capability information.

Clause 16. The method of clause 10, the second communication connection is a communication with the second network using a second subscriber identity module of the wireless device.

Clause 17. The method of clause 10, wherein the user equipment assistance information message is used to inform the network at least one of: a delay budget report carrying desired increment or decrement in a connected mode discontinuous reception (DRX) cycle length; an overheating assistance information; an in-device coexistence (IDC) assistance information; a preference on DRX parameters for power saving; a preference on a maximum aggregated bandwidth for power saving; a preference on a maximum number of secondary component carriers for power saving; a preference on a maximum number of multiple-input and multiple-output (MIMO) layers for power saving; a preference on a minimum scheduling offset for cross-slot scheduling for power saving; a preference on radio resource control (RRC) state; a configured grant assistance information for New Radio (NR) sidelink communication; a preference in being provisioned with reference time information; a preference for frequency range 2 (FR2) uplink (UL) gap; a preference to transition out of RRC_CONNECTED state for multiple universal subscriber identity modules (MUSIM) operation; a preference on the MUSIM gaps; a relaxation state for radio link monitoring (RLM) measurements; a relaxation state for beam failure detection (BFD) measurements; an availability of data mapped to radio bearers which are not configured for small data transmission (SDT); a preference for secondary cell group (SCG) to be deactivated; an indication that the wireless device has uplink data to transmit for a data radio bearer (DRB) for which there is no master cell group (MCG) radio link control (RLC) bearer while a secondary cell group (SCG) is deactivated; or a change to a fulfilment status for radio resource management (RRM) measurement relaxation criterion.

Clause 18. A method of wireless communication, comprising: receiving, by a first network, a user equipment assistance information message that is transmitted from the wireless device to update a radio access capability between the wireless device and the first network.

In some implementations, the first network may include a base station including a next generation Node B (gNB), enhanced Node B (eNB), or any other device that performs as a base station. In some implementations, the user equipment assistance information message may include the UE assistance information message (UEAssistanceInformation message) discussed above.

Clause 19. The method of clause 18, wherein the user equipment assistance information message includes user equipment capability information.

Clause 20. The method of clause 19, wherein the user equipment capability information includes at least two user equipment radio access capability sets associated with the wireless device, and wherein the user equipment assistance information message includes a capability information indicator to indicate a user equipment radio access capability set out of the user equipment radio access capability sets.

Clause 21. The method of clause 20, wherein the user equipment capability set is combined with one or more user equipment capability radio access technology (RAT) containers, wherein each user equipment capability RAT container indicates user equipment capabilities associated with one RAT type.

Clause 22. The method of clause 20, wherein the capability information indicator in the user equipment assistance information message indicates a user equipment capability set in the user equipment capability information.

Clause 23. The method of clause 18, wherein the second communication connection is a communication with the second network using a second subscriber identity module of the wireless device.

Clause 24. The method of clause 18, wherein the user equipment assistance information message is used to inform the network at least one of: a delay budget report carrying desired increment or decrement in a connected mode discontinuous reception (DRX) cycle length; an overheating assistance information; an in-device coexistence (IDC) assistance information; a preference on DRX parameters for power saving; a preference on a maximum aggregated bandwidth for power saving; a preference on a maximum number of secondary component carriers for power saving; a preference on a maximum number of multiple-input and multiple-output (MIMO) layers for power saving; a preference on a minimum scheduling offset for cross-slot scheduling for power saving; a preference on radio resource control (RRC) state; a configured grant assistance information for New Radio (NR) sidelink communication; a preference in being provisioned with reference time information; a preference for frequency range 2 (FR2) uplink (UL) gap; a preference to transition out of RRC_CONNECTED state for multiple universal subscriber identity modules (MUSIM) operation; a preference on the MUSIM gaps; a relaxation state for radio link monitoring (RLM) measurements; a relaxation state for beam failure detection (BFD) measurements; an availability of data mapped to radio bearers which are not configured for small data transmission (SDT); a preference for secondary cell group (SCG) to be deactivated; an indication that the wireless device has uplink data to transmit for a data radio bearer (DRB) for which there is no master cell group (MCG) radio link control (RLC) bearer while a secondary cell group (SCG) is deactivated; or a change to a fulfilment status for radio resource management (RRM) measurement relaxation criterion.

Clause 25. An apparatus for wireless communication comprising a processor that is configured to carry out the method of any of clauses 1 to 24.

Clause 26. A non-transitory computer readable medium having code stored thereon, the code when executed by a processor, causing the processor to implement a method recited in any of clauses 1 to 24.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:

transmitting, by a wireless device, to a first network in a first communication connection with the wireless device, a user equipment assistance information message to update a radio access capability between the wireless device and the first network due to detecting a change in the radio access capability between the wireless device and the first network, wherein the user equipment assistance information message includes a capability information indicator identifying, among a plurality of user equipment radio access capability sets previously provided to the first network, a user equipment radio access capability set to be applied, wherein the first network updates the radio access capability between the wireless device and the first network by selecting the identified user equipment radio access capability set from the plurality of user equipment radio access capability sets, wherein an establishment of a second communication connection is initiated by the wireless device before or after or concurrently with transmitting the user equipment assistance information message.

2. The method of claim 1, further comprising:

before transmitting the user equipment assistance information message to the first network, receiving, by the wireless device, a capability enquiry message from the first network in the first communication connection with a first subscriber identity module of the wireless device; and transmitting, by the wireless device, to the first network, a capability information message indicating a radio access capability between the wireless device and the first network.

3. The method of claim 2, wherein the capability information message includes the plurality of user equipment radio access capability sets associated with the wireless device.

4. The method of claim 3, wherein each of the plurality of user equipment radio access capability sets is combined with one or more user equipment capability radio access technology (RAT) containers, wherein each user equipment capability RAT container indicates user equipment capabilities associated with one RAT type.

5. The method of claim 3, wherein the capability information indicator in the user equipment assistance information message indicates a user equipment radio access capability set among the plurality of user equipment radio access capability sets in the capability information message.

6. The method of claim 1, wherein the second communication connection is in communication with a second network using a second subscriber identity module of the wireless device.

7. The method of claim 1, wherein the user equipment assistance information message, which includes the capability information indicator identifying, among a plurality of user equipment radio access capability sets, the user equipment radio access capability set to be applied, is used to inform the network at least one of:

a delay budget report carrying desired increment or decrement in a connected mode discontinuous reception (DRX) cycle length;

an overheating assistance information;

an in-device coexistence (IDC) assistance information;

a preference on DRX parameters for power saving;

a preference on a maximum aggregated bandwidth for power saving;

a preference on a maximum number of secondary component carriers for power saving;

a preference on a maximum number of multiple-input and multiple-output (MIMO) layers for power saving;

a preference on a minimum scheduling offset for cross-slot scheduling for power saving;

a preference on radio resource control (RRC) state;

a configured grant assistance information for New Radio (NR) sidelink communication;

a preference in being provisioned with reference time information;

a preference for frequency range 2 (FR2) uplink (UL) gap;

a preference to transition out of RRC_CONNECTED state for multiple universal subscriber identity modules (MUSIM) operation;

a preference on the MUSIM gaps;

a relaxation state for radio link monitoring (RLM) measurements;

a relaxation state for beam failure detection (BFD) measurements;

an availability of data mapped to radio bearers which are not configured for small data transmission (SDT);

a preference for secondary cell group (SCG) to be deactivated;

an indication that the wireless device has uplink data to transmit for a data radio bearer (DRB) for which there is no master cell group (MCG) radio link control (RLC) bearer while a secondary cell group (SCG) is deactivated; or a change to a fulfilment status for radio resource management (RRM) measurement relaxation criterion.

8. A method of wireless communication, comprising:

transmitting, by a wireless device, to a first network, a user equipment assistance information message to update a first radio access capability between the wireless device and the first network based on releasing a second communication connection between the wireless device and a second network, wherein the user equipment assistance information message includes a capability information indicator identifying, among a plurality of user equipment radio access capability sets previously provided to the first network, a user equipment radio access capability set to be applied, wherein the first network updates the radio access capability between the wireless device and the first network by selecting the identified user equipment radio access capability set from the plurality of user equipment radio access capability sets, wherein the releasing of the second communication connection is initiated before or after or concurrently with transmitting the user equipment assistance information message.

9. The method of claim 8, further comprising:

before or after or concurrently with transmitting the user equipment assistance information message, initiating the releasing of the second communication connection.

10. The method of claim 8, wherein the user equipment assistance information message includes user equipment capability information corresponding to the identified user equipment radio access capability set.

11. The method of claim 10, wherein the user equipment capability information includes the plurality of user equipment radio access capability sets associated with the wireless device.

12. The method of claim 11, wherein the user equipment capability set is combined with one or more user equipment capability RAT containers, wherein each user equipment capability RAT container indicates user equipment capabilities associated with one RAT type.

13. The method of claim 11, wherein the capability information indicator in the user equipment assistance information message indicates a user equipment capability set in the user equipment capability information.

14. The method of claim 8, the second communication connection is a communication with the second network using a second subscriber identity module of the wireless device.

15. The method of claim 8, wherein the user equipment assistance information message, which includes the capability information indicator identifying, among a plurality of user equipment radio access capability sets, the user equipment radio access capability set to be applied, is used to inform the first network at least one of:

a delay budget report carrying desired increment or decrement in a connected mode discontinuous reception (DRX) cycle length;

an overheating assistance information;

an in-device coexistence (IDC) assistance information;

a preference on DRX parameters for power saving;

a preference on a maximum aggregated bandwidth for power saving;

a preference on a maximum number of secondary component carriers for power saving;

a preference on a maximum number of multiple-input and multiple-output (MIMO) layers for power saving;

a preference on a minimum scheduling offset for cross-slot scheduling for power saving;

a preference on radio resource control (RRC) state;

a configured grant assistance information for New Radio (NR) sidelink communication;

a preference in being provisioned with reference time information;

a preference for frequency range 2 (FR2) uplink (UL) gap;

a preference to transition out of RRC_CONNECTED state for multiple universal subscriber identity modules (MUSIM) operation;

a preference on the MUSIM gaps;

a relaxation state for radio link monitoring (RLM) measurements;

a relaxation state for beam failure detection (BFD) measurements;

an availability of data mapped to radio bearers which are not configured for small data transmission (SDT);

a preference for secondary cell group (SCG) to be deactivated;

an indication that the wireless device has uplink data to transmit for a data radio bearer (DRB) for which there is no master cell group (MCG) radio link control (RLC) bearer while a secondary cell group (SCG) is deactivated; or a change to a fulfilment status for radio resource management (RRM) measurement relaxation criterion.

16. A method of wireless communication, comprising:

receiving, by a first network, a user equipment assistance information message that is transmitted from a wireless device to update a radio access capability between the wireless device and the first network, wherein the user equipment assistance information message includes user equipment capability information, wherein the user equipment capability information includes at least two user equipment radio access capability sets associated with the wireless device, and wherein the user equipment assistance information message includes a capability information indicator identifying, among the plurality of user equipment radio access capability sets, a user equipment radio access capability set to be applied, wherein the first network updates the radio access capability between the wireless device and the first network by selecting the identified user equipment radio access capability set from the plurality of user equipment radio access capability sets.

17. The method of claim 16, wherein the user equipment capability set is combined with one or more user equipment capability radio access technology (RAT) containers, wherein each user equipment capability RAT container indicates user equipment capabilities associated with one RAT type.

18. The method of claim 16, wherein the capability information indicator in the user equipment assistance information message indicates a user equipment capability set in the user equipment capability information.

19. The method of claim 16, wherein a second communication connection between the wireless device and a second network uses a second subscriber identity module of the wireless device.

20. The method of claim 16, wherein the user equipment assistance information message, which includes the capability information indicator identifying, among a plurality of user equipment radio access capability sets, the user equipment radio access capability set to be applied, is used to inform the first network at least one of:

a delay budget report carrying desired increment or decrement in a connected mode discontinuous reception (DRX) cycle length;

an overheating assistance information;

an in-device coexistence (IDC) assistance information;

a preference on DRX parameters for power saving;

a preference on a maximum aggregated bandwidth for power saving;

a preference on a maximum number of secondary component carriers for power saving;

a preference on a maximum number of multiple-input and multiple-output (MIMO) layers for power saving;

a preference on a minimum scheduling offset for cross-slot scheduling for power saving;

a preference on radio resource control (RRC) state;

a configured grant assistance information for New Radio (NR) sidelink communication;

a preference in being provisioned with reference time information;

a preference for frequency range 2 (FR2) uplink (UL) gap;

a preference to transition out of RRC_CONNECTED state for multiple universal subscriber identity modules (MUSIM) operation;

a preference on the MUSIM gaps;

a relaxation state for radio link monitoring (RLM) measurements;

a relaxation state for beam failure detection (BFD) measurements;

an availability of data mapped to radio bearers which are not configured for small data transmission (SDT);

a preference for secondary cell group (SCG) to be deactivated;

an indication that the wireless device has uplink data to transmit for a data radio bearer (DRB) for which there is no master cell group (MCG) radio link control (RLC) bearer while a secondary cell group (SCG) is deactivated; or a change to a fulfilment status for radio resource management (RRM) measurement relaxation criterion.

* * * * *